(12) United States Patent
Moser

(10) Patent No.: US 8,161,853 B2
(45) Date of Patent: Apr. 24, 2012

(54) CENTERING BUSHING FOR CENTERING MATERIAL BARS

(75) Inventor: Hansjürg Moser, Frutigen (CH)

(73) Assignee: Moser Mechanik, Frutigen (CH)

( * ) Notice: Subject to any disclaimer, the term of this patent is extended or adjusted under 35 U.S.C. 154(b) by 258 days.

(21) Appl. No.: 12/595,928

(22) PCT Filed: Mar. 10, 2008

(86) PCT No.: PCT/EP2008/052818
§ 371 (c)(1),
(2), (4) Date: Oct. 14, 2009

(87) PCT Pub. No.: WO2008/131988
PCT Pub. Date: Nov. 6, 2008

(65) Prior Publication Data
US 2010/0139462 A1    Jun. 10, 2010

(30) Foreign Application Priority Data

Apr. 27, 2007 (CH) .......................... 700/07

(51) Int. Cl.
*B23B 23/04* (2006.01)
*B23B 23/00* (2006.01)
(52) U.S. Cl. .......................... 82/170; 82/124
(58) Field of Classification Search .............. 82/170, 82/117, 127, 126, 124, 902, 148, 150, 151; 409/159, 172; 414/14, 17; 279/5
See application file for complete search history.

(56) References Cited

U.S. PATENT DOCUMENTS

| | | | | | |
|---|---|---|---|---|---|
| 3,696,696 | A | * | 10/1972 | Bechler | 82/127 |
| 4,407,176 | A | * | 10/1983 | Link | 82/127 |
| 6,099,226 | A | * | 8/2000 | Ito et al. | 414/14 |
| 2003/0159554 | A1 | * | 8/2003 | Cucchi | 82/126 |

FOREIGN PATENT DOCUMENTS

| | | |
|---|---|---|
| CH | 580 999 | 10/1976 |
| CH | 597 951 | 4/1978 |
| DE | 32 10 630 A1 | 11/1982 |
| EP | 0 999 003 A2 | 5/2000 |
| GB | 1 500 629 | 2/1978 |

* cited by examiner

*Primary Examiner* — Will Fridie, Jr.
(74) *Attorney, Agent, or Firm* — Birch, Stewart, Kolasch & Birch, LLP

(57) ABSTRACT

The invention relates to a centering bushing for centering a material bar which is supplied to a chuck of a lathe. An outer construction and an inner construction arranged therein are rotatably arranged about the longitudinal axis of a material bar. The inner construction is arranged to be rotatable with respect to the outer construction. The outer construction has means to fix the inner construction with respect to the chuck. The outer construction has a centrifugal force device which produces a force corresponding to the rotational speed. The inner construction has a centering device which leads to a centering of the material bar due to a force exerted on the centering device. A force transmission unit is arranged between the outer construction and the inner construction and ensures that the inner construction can rotate, with respect to the outer construction, and transfers the force produced by the centrifugal force device to the centering device.

11 Claims, 4 Drawing Sheets

CENTERING BUSHING FOR CENTERING MATERIAL BARS

TECHNICAL FIELD

The present invention relates to a centering chuck for centering material bars that are supplied to a collet chuck of a lathe.

PRIOR ART

Various lathe concepts are known in the prior art. Such lathe concepts may be a lathe (also termed turning center) having various tools, a collet chuck, a single-bar loader or a bar loading magazine, by means of which loader or magazine material bars of, for example, 1 m to 6 m in length are received and supplied to the collet chuck by means of a ram device, and can thus be machined by a tool. Such a lathe concept is suitable for producing workpieces of various types. In the production of a workpiece, the collet chuck is opened, and the material bar is guided by a required length into the collet chuck by means of the single-bar loader or the bar loading magazine. The collet chuck is thereupon closed, and the material bar is accelerated up to a certain rotational speed. By means of tools arranged in the lathe, the end of the material bar that is clamped in the collet chuck is machined, and a workpiece having a required shape is produced. Following production, the workpiece is parted from the material bar. The rotation of the material bar is then stopped, the collet chuck is opened and the material bar is again advanced by a certain length by means of the ram device, and the production of a next workpiece is performed.

Since material bars are not fully centered and often have a certain unbalance, the following events may occur, particularly at higher rotational speeds and in the case of longer material bars. A very great amount of noise may be produced, resulting in health problems, such as damage to hearing, nerve damage or severe fatigue, in the operator of the lathe or in persons present in the machine hall. There may be impairment of the service life of the machine or, at least, possibly expensive repairs and/or high costs resulting from machine downtimes, owing to high stressing as a result of vibration of bearings, the electronics, the bar loader or other machine parts. The eccentrically acting (wobbling) forces in the region of the collet chuck can result, in the case of axial loading of the material bar, for example during drilling, by a tool of the lathe, in the material bar being pushed back, and consequently in production of defective parts. In the case of differing rotational speeds, there may be concentricity problems, which can occur, in particular, when a first machining step has to be effected at a low, first rotational speed and a second machining step has to be effected at a much higher, second rotational speed, it being the case that the centering of the workpiece may vary in the case of these differing rotational speeds and inaccurate concentricity may occur during the machining of the workpiece.

The patent specification CH 597 951 describes a device for advancing bar-type material for an automatic lathe. A device for supplying a workpiece is designed in such a way that there is no need to effect excessive chucking of the workpiece, and a ram can enter the spindle. Further, two guide rings are arranged in the spindle, with a small clearance in relation to the workpiece, such that the workpiece is guided at least three points during machining. It is a disadvantage that the centering of material bars can only be inadequately ensured by means of such a device.

The European patent specification EP 0 999 003 describes a bar machining device comprising a collet chuck, a spindle and a hollow shaft. The hollow shaft is mounted coaxially in relation to the collet chuck, and serves to receive a bar. Oil is delivered into the hollow shaft by means of an oil injection device, such that an oil layer is formed around the outer surface of the bar. It is a disadvantage that the centering of material bars can only be inadequately ensured by means of such a device. Additionally, ensuring an oil layer in the described form is complicated. Owing to the use of sliding oil for the purpose of hydrodynamic bearing of the material bar, this sliding oil gets into the machine. As a result, there is intermixing between the sliding oil and the machining oils or emulsions used for machining. The sliding oil and the machining oils or emulsions perform entirely differing functions. The machining oils or emulsions are intended to provide the material-removing tools with aggressive grip, whereas the sliding oil effects precisely the opposite, and results in a reduction of the tool downtimes. Machining oils or emulsions are normally collected in the machine and supplied for re-use. The machining oils or emulsions that are mixed with sliding oil, however, have to be replaced after only relatively brief use.

The published patent specification DE 32 10 630 describes a device for automatically supplying bar material to a lathe. A plurality of clamping holders, having clamping jaws and pulleys, are arranged along the bar. These holders serve to hold a bar while it is being supplied to a lathe. It is a disadvantage that the control of the pulleys is very complicated and resource-intensive. In addition, major adaptations are required in order to apply such a device in the case of existing lathes.

The patent specification CH 580 999 describes a guide device on an automatic lathe, for centering and stabilizing rotating round and profiled bars. The guide device is fastened to the supply tube of a bar loading magazine. A rotor of the guide device is driven via the spindle of the automatic lathe. Levers, which swivel out about rotation points as a result of the centrifugal force, are mounted on the rotor. Mounted at one end of the levers are rollers, which, owing to the swiveling-out, exert a force upon the material bar and cause the material bar to be centered. It is a disadvantage of this device that it is necessary for the latter to be connected to the bar loading magazine and, at the same time, to the spindle of the automatic lathe. The centrifugal forces, which, in some instances, are very great in the case of slightly warped material bars, have to be absorbed by the bar loaders, which are of a rather light structure. Consequently, only an inadequate suppression of vibration and noise can be achieved. Further, it is a disadvantage that the rollers are permanently in motion. In the case of loading magazines, stationary ram devices are used. In the case of use of this device, therefore, the rollers or the ram device would be destroyed after only a very brief period of use.

PRESENTATION OF THE INVENTION

It is an object of the present invention to propose a new centering chuck for centering material bars that are supplied to a collet chuck of a lathe, which centering chuck does not have the disadvantages of the prior art. The new centering chuck is intended to be suitable, in particular, for centering the material bar and also for centering the ram device by which the material bar is pushed into the collet chuck.

According to the present invention, these objects are achieved, in particular, by the elements of the independent claims. Further advantageous embodiments are disclosed, in addition, by the dependent claims and the description.

In particular, these objects are achieved by the invention in that the centering chuck comprises an outer structure that is rotatable about the longitudinal axis of the material bar, the centering chuck comprises an inner structure that is rotatable about the longitudinal axis of the material bar, the inner structure being arranged substantially within the outer structure, and the inner structure being arranged so as to rotatable in relation to the outer structure, the inner structure is set up to enable the material bar to be guided through the inner structure, the outer structure comprises means for fixing the outer structure in relation to the collet chuck, the outer structure comprises a centrifugal force device that produces a force corresponding to the rotational speed, the inner structure comprises a centering device, which, owing to a force applied to the centering device, causes the material bar to be centered, and there is arranged between the outer structure and the inner structure a force transfer device that ensures that the inner structure is rotatable in relation to the outer structure, and that transfers to the centering device the force produced by the centrifugal-force device. Such a centering chuck has the advantage, in particular, that the material bar supplied to the collet chuck is centered, and the ram device, which, beyond a certain length of the material bar, is grasped by the centering chuck, is centered.

In one embodiment variant, at least one ball bearing is arranged between the inner structure and the outer structure. Such a centering chuck has the advantage, in particular, that the rotatable arrangement of the inner structure in relation to the outer structure comprises proven and robust means.

In another embodiment variant, the force transfer device comprises at least one ball bearing. Such a centering chuck has the advantage, in particular, that the force transfer device, by simple and robust means, ensures the rotatability of the inner structure in relation to the outer structure and, at the same time, transfer of force between the outer structure and the inner structure.

In a further embodiment variant, a damping element is arranged between the force transfer device and the centering device. Such a centering chuck has the advantage, in particular, that the longevity of the centering chuck can be ensured.

In another embodiment variant, three centering devices are mounted, arranged at regular intervals along the circumference of the material bar. Such a centering chuck has the advantage, in particular, that very quiet running and high effectiveness in centering can be achieved.

BRIEF DESCRIPTION OF THE DRAWINGS

Embodiment variants of the present invention are explained in the following with reference to examples. The examples of the embodiments are illustrated by the following appended figures.

MODE(S) OF REALIZATION OF THE INVENTION

Figure 1:
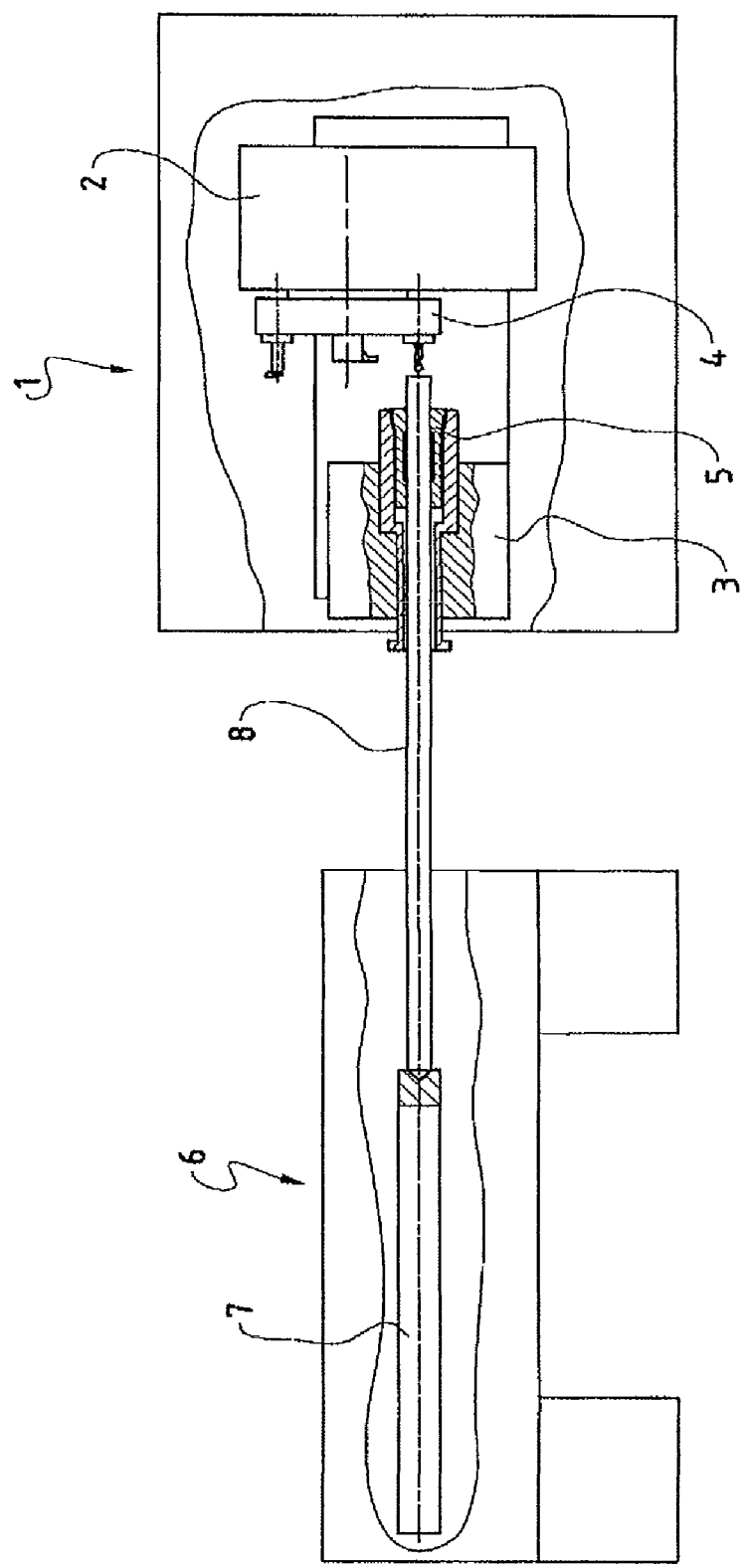
FIG. 1 shows, schematically, a lathe and a bar loader according to the prior art.

In FIG. 1, the reference 1 denotes a lathe, or turning center. The lathe 1 comprises a tool carriage 2 having a device for receiving tools. Such a device for receiving tools can be realized, for example, as a rotatable device, in particular as a turret 4. Various tools can be mounted on such a turret 4, in particular tools for machining workpieces of differing materials, tools designed for differing machining speeds or also, for example, drills. The lathe 1 further comprises a spindle head 3. The spindle head 3 can comprise a hollow shaft and a collet chuck 5, arranged axially in relation thereto. The hollow shaft and the collet chuck 5 can be driven by means of a motor (not represented) as well as, for example, by means of a transmission (not represented). Depending on the application of the lathe 1 and depending on the workpiece, rotational speeds of, for example, 2000-3000 rpm, of 7000 rpm or of up to, for example, 18000 rpm can be achieved. The hollow shaft can be so designed that a workpiece can be supplied to the collet chuck 5 through the hollow shaft, the workpiece being able to be clamped in the collet chuck 5 and accelerated to a certain rotational speed, and the rotating workpiece being able to be machined by means of a tool mounted in the tool carriage 2. For this purpose, in particular, the tool carriage 2 comprises the devices necessary for moving a tool in a relative motion in relation to the workpiece.

In FIG. 1, the reference 6 denotes a bar loader, or a device for supplying a bar-type workpiece to the lathe 1. In FIG. 1, the reference 8 denotes such a material bar. The bar loader 6 can be set up to receive material bars of, for example, 1 m in length up to, for example, 6 m in length. Such material bars can consist, in particular, of a round material, a square material or a hexagonal material. Depending on the type of material bar 8, the disadvantage described above, thus, for example, the disadvantage of noise development, can occur, being pronounced to a greater or lesser extent. The bar loader 6 comprises, in particular, a ram device 7, in order to supply the material bar 8 to the lathe 1. For this purpose, the ram device 7 can comprise, in particular, a head carried on a ball bearing, such that the material bar 8, rotating during machining, can be rotatably supported in relation to the non-rotating ram device 7.

A lathe 1 as shown diagrammatically in FIG. 1 and a corresponding bar loader 6 can be set up to produce workpieces in a fully automatic manner over a relatively long period of time, such as, for example, over several hours. Thus, the bar loader 6 can be realized, for example, as a bar loading magazine for receiving a plurality of material bars. In the case of such fully automatic operation, the rotation of the material bar is stopped following the production of a workpiece, and the collet chuck 5 is then opened. By means of the ram device 7, the material bar is pushed by a certain length in the direction of the tool carriage 2, and the collet chuck 5 is reclosed. The material bar is then put into rotation, and a further workpiece is produced by means of the tools mounted in the tool carriage 2.

Figure 2:
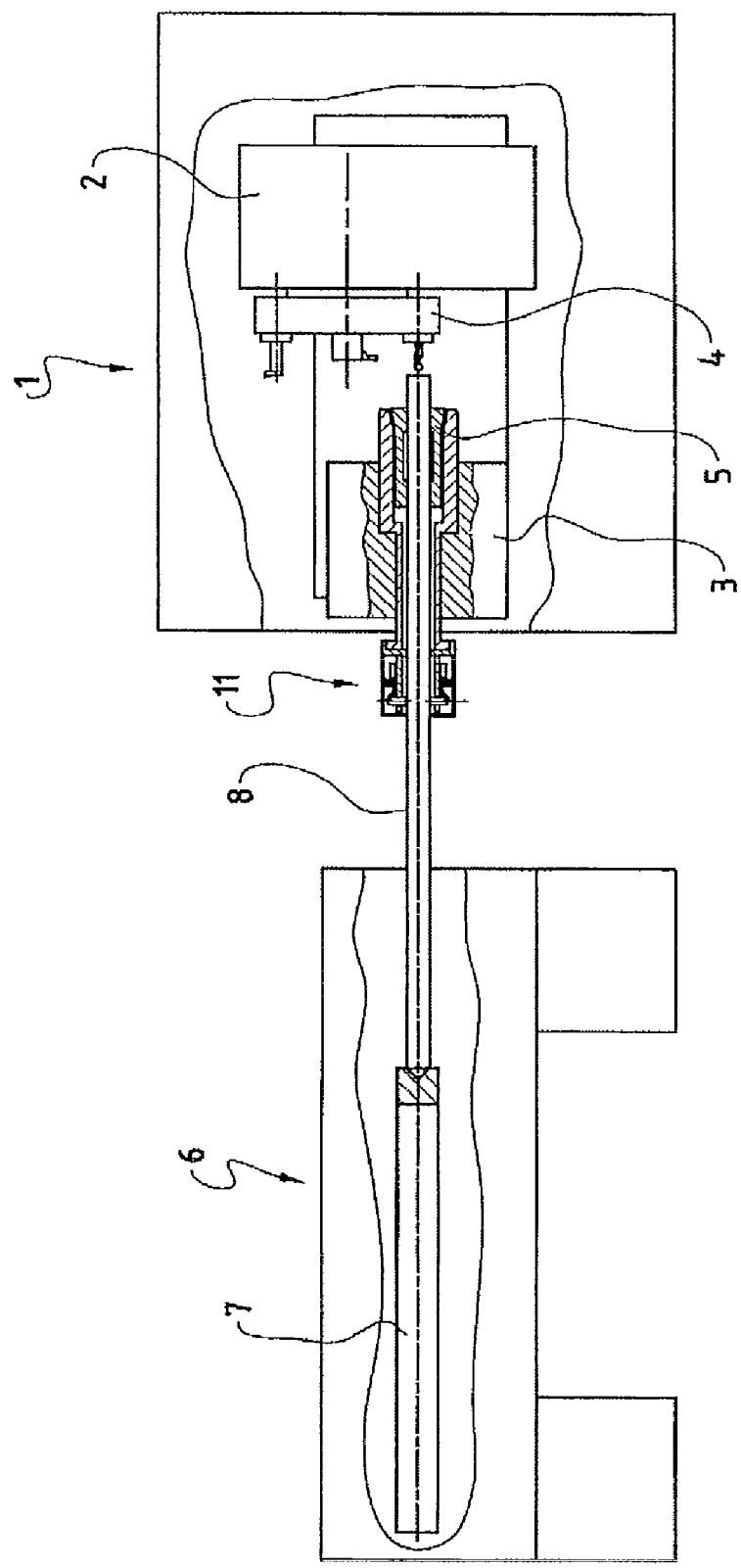
FIG. 2 shows, schematically, a lathe and a bar loader having a mounted centering chuck according to the invention.

Represented in FIG. 2 is a lathe 1 with a bar loader 6, a centering chuck 11 according to the invention being mounted on the hollow shaft of the spindle head 3.

Figure 3:
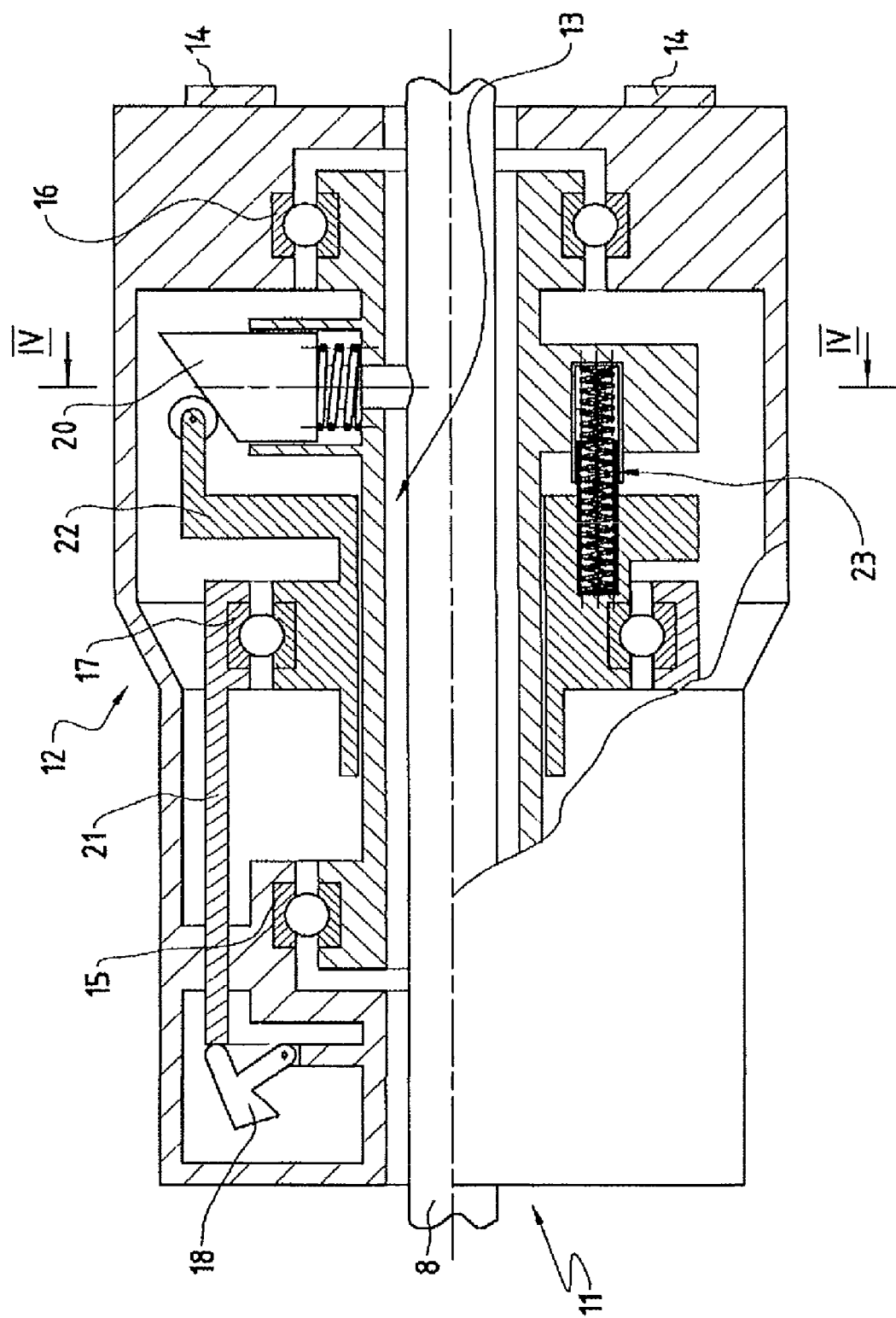
FIG. 3 shows, schematically, a centering chuck according to the invention.

A centering chuck 11 according to the invention is represented schematically in FIG. 3. The centering chuck 11 comprises an outer structure 12 and an inner structure 13. In FIG. 3, parts of the outer structure 12 are represented in a first hatching, and parts of the inner structure 13 are represented in a second hatching. The outer structure 12 comprises means 14 for fixing the outer structure 12 in relation to the collet chuck 5. The means 14 for fixing in relation to the collet chuck 5 can be realized in a manner known to one skilled in the art, and can comprise, in particular, a flange or equivalent means for connection to the hollow shaft of the spindle head 3. The fixing of the outer structure 12 in relation to the collet chuck 5 causes the outer structure 12 to be rotated at the same rotational speed as the collet chuck, i.e., during the machining of the material bar, the outer structure 12 is rotated at a certain rotational speed, and the outer structure 12 is stationary while the material bar 8 is being pushed in the direction of the tool carriage.

As shown diagrammatically in FIG. 3, the inner structure 13 is arranged substantially within the outer structure 12. The inner structure 13 is arranged so as to be rotatable in relation to the outer structure 12. Such a rotatable arrangement can be achieved, for example, as shown diagrammatically in FIG. 3, by the ball bearings 15, 16, 17. Clearly, embodiment variants that perform the same technical function of the rotatable arrangement of the inner structure 13 are known to one skilled in the art. One or more of the ball bearings 15, 16, 17 can also be realized through the use of two or more ball bearings arranged next to one another. It is also conceivable, in principle, to dispense with certain of these ball bearings.

In FIG. 3, the reference 18 denotes a centrifugal-force device. The centrifugal-force device 18 is mounted on the outer structure 12. As shown diagrammatically in FIG. 3, the centrifugal-force device 18 can comprise an axle and an outer part mounted on the axle, such that, upon a rotation of the outer structure 12, this outer part is moved about the axle by the centrifugal forces occurring because of the rotation. As shown diagrammatically in FIG. 3, this motion of the outer part of the centrifugal-force device 18 can be transferred to a transfer device.

In FIG. 3, the reference 20 denotes a centering device. As shown diagrammatically in FIG. 3, the centering device 20 can be guided in a sleeve. The one end, which is the upper end in FIG. 3, can comprise an inclined surface. The other end, which is the lower end in FIG. 3, can be realized to lie on the material bar 8. Through the application of a force to the inclined surface of the centering device 20, a force can be transferred onto the material bar 8. At least two, and preferably three, centering devices 20 can be mounted, for example at regular intervals, in the inner structure 13 and, through the application of a force to the inclined surfaces of the centering devices 20, a force acting in the direction of the axis of the material bar can thus be applied to the material bar 8. These forces can be used to effect centering of the material bar 8.

As shown diagrammatically in FIG. 3, force produced by the centrifugal-force device 18 as a result of the rotation of the outer structure can be transferred to the inclined surface of the centering device 20 by means of a transfer device 21. The transfer device 21 comprises a first transfer part 21, which is mounted on the outer structure 12, and a second transfer part 22, which is mounted on the inner structure 13. A ball bearing 17 is mounted between the first transfer part 21 and the second transfer part 22. Instead of a single ball bearing 17, two or more ball bearings, mounted parallelwise, can be provided. As shown diagrammatically in FIG. 3, the first transfer part 21 is mounted so as to be displaceable in the axial direction on the outer structure 12. The first transfer part 21 is set up to take up the force produced by the centrifugal-force device 18 and transfer it to the ball bearing 17. This force is transferred to the second transfer part 22 by means of the ball bearing. The second transfer part 22 is mounted, for example, as shown diagrammatically in FIG. 3, as a sleeve that is displaceable in the axial direction on an inner part of the inner structure that is carried by the ball bearing 15 and the ball bearing 16. The force applied to the ball bearing 17 can be taken up by the second transfer part 22. A roller, by means of which this force can be transferred to the centering means, can be mounted at one end of the second transfer part 22, and this force can be used to effect centering of the material bar 8.

Since the outer structure 12 is fixed in relation to the collet chuck 5 because of the aforementioned means 14, the outer structure 12 is rotated at the same rotational speed as the collet chuck. Since the inner structure 13 is arranged so as to be freely rotatable in relation to the outer structure 12, the rotational speed of the inner structure 13 can be matched to the rotational speed of the material bar 8, or of the ram device 7. Provided that parts of the material bar 8 are present at the location of the centering means 20, the inner structure 13 is rotated at the same rotational speed as the material bar 8. Since the material bar 8 is clamped in the collet chuck, the rotational speed of the inner structure 13 in this case is the same as the rotational speed of the outer structure 12. As a result of the material bar 8 being shifted by means of the ram device 7, beyond a certain length of the material bar the ram device 7 is present at the location of the centering means 20. Since the ram device does not rotate, in this case the rotational speed of the inner structure 13 is equal to zero.

The constituent parts of the centering chuck that are shown diagrammatically in FIG. 3 can be so arranged that the material bar 8, or the ram device 7, is centered substantially at two points, at three points or at more points. In particular, a corresponding number of centering means can be provided for this purpose.

As shown diagrammatically in FIG. 3, the centering means 20 can be pushed away from the material bar 8 by means of a spring, such that the centering means 20 are not in contact with the material bar 8 when the outer structure 12 is stationary. This prevents, for example, scratching of the material bar 8 when being pushed by the ram device 7.

In FIG. 3, the reference 23 denotes a damping element. The damping element 23 can be arranged, for example, between, on the one hand, parts of the inner structure 13 that are connected to the centering means 20, and, on the other hand, parts of the inner structure 13 that are connected to the second transfer part 22. The damping element 23 can comprise, for example, spring elements and/or pressure containers filled with oil or air. By means of the damping element 23, the motional dynamics between the second transfer part 22 and the centering means 20 can be set and/or controlled in the required manner.

Figure 4:
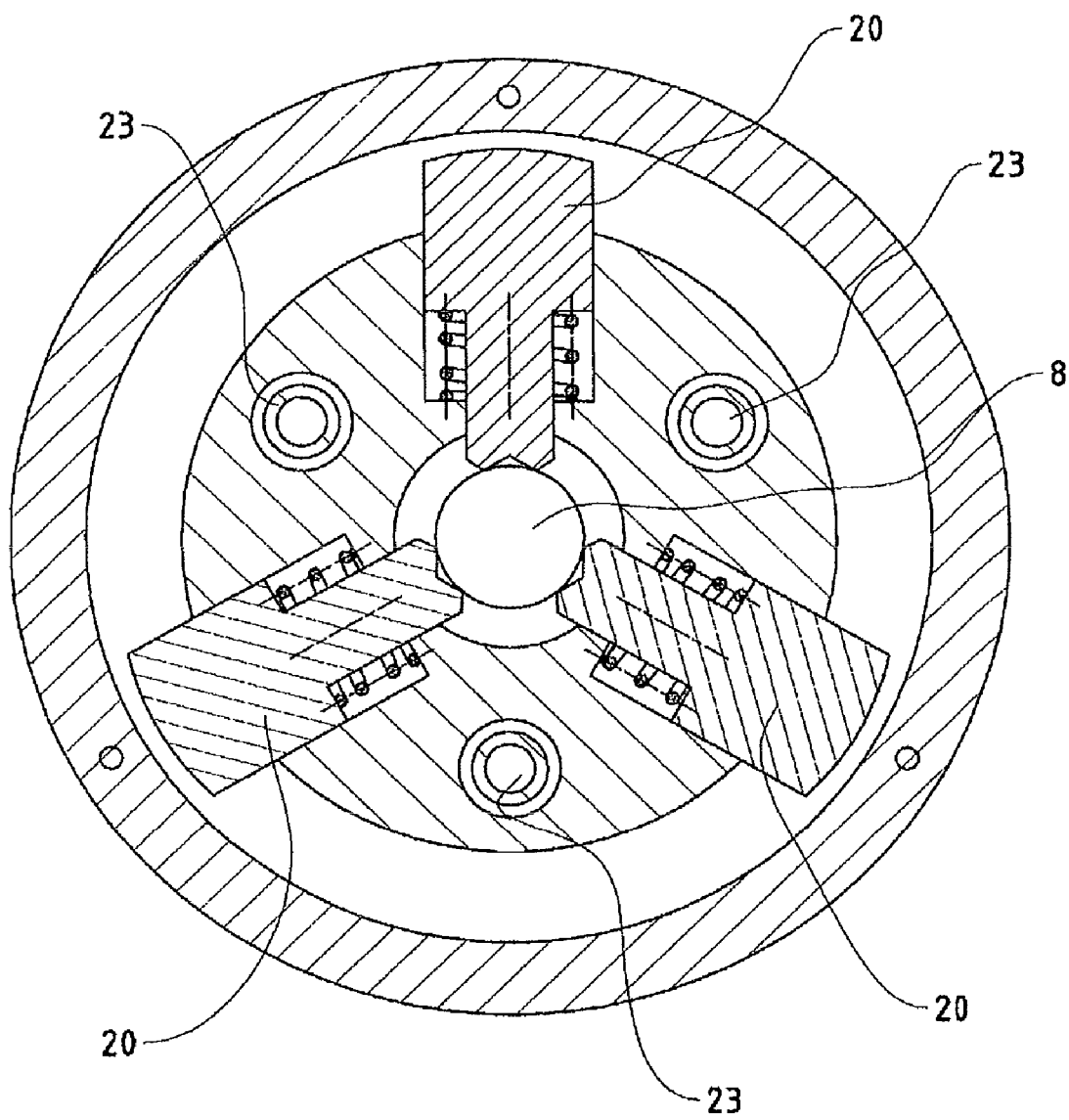
FIG. 4 shows, schematically, a cross-section through a centering chuck according to the invention.

The cross-section IV-IV represented in FIG. 3 is shown schematically in FIG. 4. Represented in FIG. 4 are three symmetrically arranged centering devices 20. It is to be mentioned that, clearly, it is also possible for only two centering devices 20, or a greater number of centering devices 20, to be arranged. As shown diagrammatically in FIG. 4, a material bar 8 is centered by the centering devices 20. Also shown in FIG. 4 are three damping elements 23. It is also possible, however, for only a single damping element 23 to be arranged, or there can be a greater number of damping elements 23.

The invention claimed is:

1. A centering chuck for centering a material bar that is supplied to a collet chuck of a lathe, characterized in that
the centering chuck comprises an outer structure
that is rotatable about the longitudinal axis of the material bar,
the centering chuck comprises an inner structure
that is rotatable about the longitudinal axis of the material bar, the inner structure being arranged substantially within the outer structure, and the inner structure being arranged so as to be
rotatable in relation to the outer structure,
the inner structure is set up to enable the material bar to be guided through the inner structure,
the outer structure comprises means for fixing the outer structure in relation to the collet chuck, the outer structure comprises a centrifugal force device that produces a force corresponding to the rotational speed, the inner structure comprises a centering device, which, owing to a force applied to the centering device, causes the material bar to be centered, and there is arranged between the outer structure and the inner structure a force transfer device that ensures that the inner structure is rotatable in relation to the outer structure, and that transfers to the centering device the force produced by the centrifugal-force device.

2. The centering chuck as claimed in claim 1, characterized in that at least one ball bearing is arranged between the inner structure and the outer structure.

3. The centering chuck as claimed in claim 1, characterized in that the force transfer device comprises at least one ball bearing.

4. The centering chuck as claimed in claim 1, characterized in that a damping element is arranged between the force transfer device and the centering device.

5. The centering chuck as claimed in claim 1, characterized in that three centering devices are mounted, arranged substantially at regular intervals along a circumference of the material bar.

6. The centering chuck as claimed in claim 2, characterized in that the force transfer device comprises at least one ball bearing.

7. The centering chuck as claimed in one of claim 2, characterized in that a damping element is arranged between the force transfer device and the centering device.

8. The centering chuck as claimed in one of claim 3, characterized in that a damping element is arranged between the force transfer device and the centering device.

9. The centering chuck as claimed in claim 2, characterized in that three centering devices are mounted, arranged substantially at regular intervals along a circumference of the material bar.

10. The centering chuck as claimed in claim 3, characterized in that three centering devices are mounted, arranged substantially at regular intervals along a circumference of the material bar.

11. The centering chuck as claimed in claim 4, characterized in that three centering devices are mounted, arranged substantially at regular intervals along a circumference of the material bar.

* * * * *